March 7, 1944.   A. G. REYNOLDS   2,343,327
FRUIT AND VEGETABLE JUICE EXTRACTOR
Filed Aug. 8, 1939   2 Sheets-Sheet 1
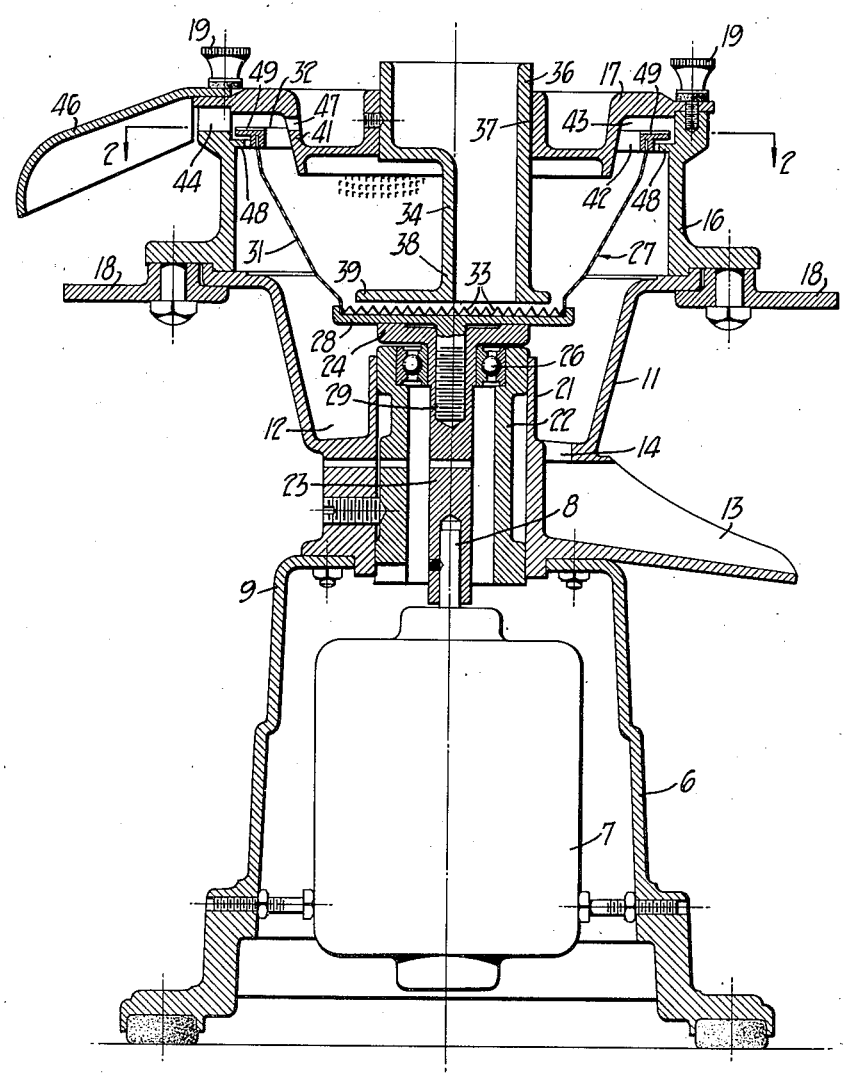
FIG_1_
INVENTOR
Albert G. Reynolds
BY
his ATTORNEY

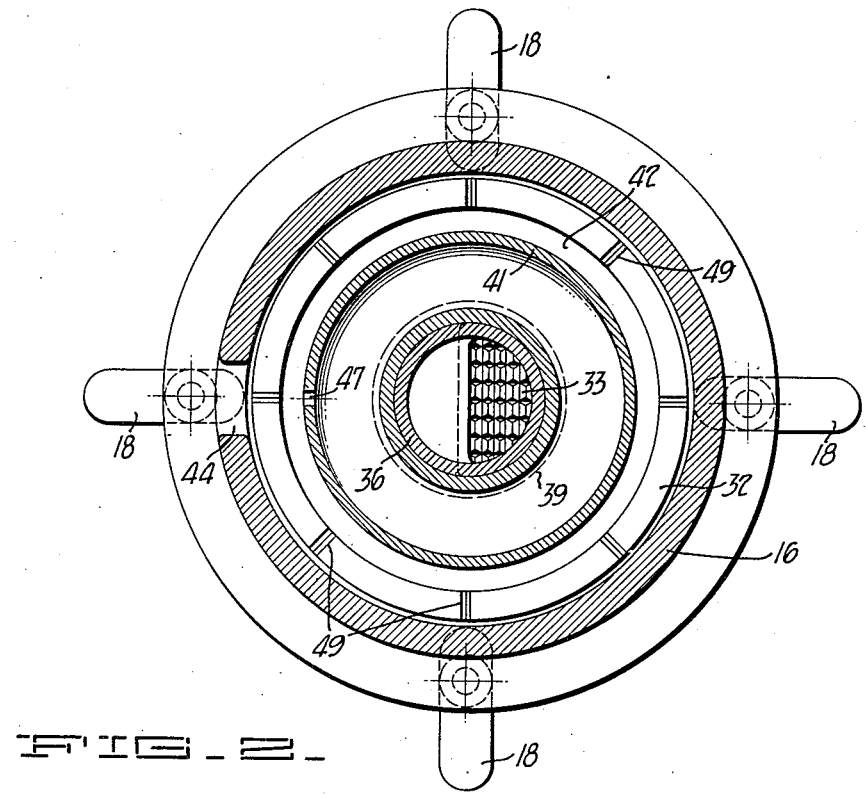
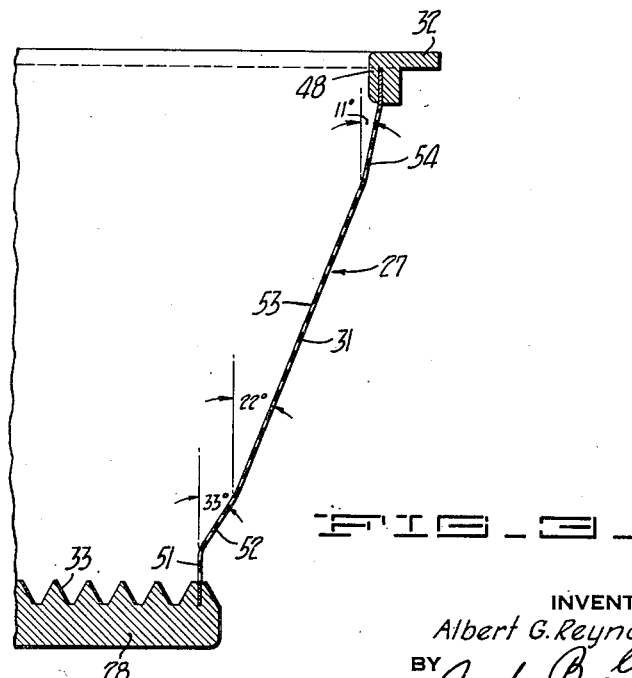

Patented Mar. 7, 1944

2,343,327

UNITED STATES PATENT OFFICE 2,343,327

FRUIT AND VEGETABLE JUICE EXTRACTOR

Albert G. Reynolds, Oakland, Calif., assignor to R. Y. P. Mfg. Co., Oakland, Calif., a corporation of California Application August 8, 1939, Serial No. 288,982

4 Claims. (Cl. 210—68)

The invention relates to fruit and vegetable juice extractors of the type wherein the fruit and vegetables or the like are grated or ground and centrifuged for separation of the juice from the pulp or solid material. The present application is a continuation-in-part application of my co-pending application, Serial No. 215,560 filed June 15, 1938.

In the extraction of juices from fruits and vegetables and other foods, particularly those having a more or less fibrous body by means of a centrifuge for separating the juice from the fibrous pulp, it is highly desirable to have the pulp automatically discharged from the machine whereby the machine may be continuously operated without stopping the machine for the removal of the pulp or fibre after a relatively small amount of juice has been extracted. At the same time it is highly desirable that the pulp be retained in the centrifuge for a sufficient time to effect a substantially complete extraction of the juice therefrom. I have found that in machines of the character described wherein the pulp has been ejected from the machine in a continuous fashion, that the pulp removed is substantially wet and that a thorough extraction of the juice is not obtained. One of the principal objects of the present invention is to provide a juice extractor of the character described wherein the pulp will be ejected from the machine during operation thereof but will be held in the centrifuge for a longer time than heretofore and thereby substantially completely dried before discharge. In accordance with the present machine the pulp of most fruits and vegetables will be retained in the centrifuge until displaced by subsequently deposited pulp, whereby the pulp will be retained in the rapidly rotating centrifuge during the normal intermittent periods of feeding the machine, such as occasioned in the introduction of several pieces of fruit or vegetable into the machine, and thus have the benefit of such intermittent period for drying of the pulp.

Another object of the invention is to provide a machine of the character described wherein the flow of the pulpy or fibrous material is controlled in such a manner as to permit a complete extraction of juice therefrom as above explained, and also to prevent clogging of the small liquid passages in the centrifuge.

Still another object of the invention is to provide a juice extractor of the character described which is constructed of a minimum number of sturdily formed parts capable of insuring a positive and efficient operation of the machine for a substantially unlimited period of time and which are arranged and constructed to permit simple and ready dismantling of the machine for cleaning, inspection and repair.

The invention possesses other objects and features of advantage, some of which with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a vertical sectional view of a fruit and vegetable juice extractor constructed in accordance with the present invention.

Figure 2 is a cross-sectional view of the extractor illustrated in Figure 1 and is taken substantially on the line 2—2 of Figure 1.

Figure 3 is a vertical sectional view of a portion of the rotary basket used in the machine.

The fruit and vegetable juice extractor of the present invention consists briefly of a rotary food basket which is preferably mounted to rotate about a substantially vertical axis and which is provided with an annular perforated concentric wall extending upwardly and outwardly from the bottom of the basket, in combination with grater or grinder means on the bottom of the basket and food conveying means to said grater means, motor means for rotating the basket at high velocity in the order of several thousand revolutions per minute to effect a grating of the food fed to the grater and a centrifugal movement of the ground food against the side wall of the basket, and wherein the outward inclination of the basket wall and the speed of rotation are predetermined so as to cause an upward movement of the pulp in a relatively thin layer over a portion only of the vertical height of the wall above which the pulp will not move under its own centrifugal force, and wherein the upward force of the subsequent ground fruit pulp deposited on the wall will successively lift the uppermost pulp to the top and out of the basket, and appropriate receiver means for the juice centrifugally expelled through the basket wall and for the pulp discharged over the top of the basket. In accordance with the present machine the ground pulp is centrifugally thrown from the grater means against a short vertical wall section or shoulder which causes a breaking up of the pulp and a deflection of the pulp to the upper diverging wall portion of the basket. The degree of divergence or inclination of the basket is predetermined in accordance with the size of the basket and the speed of rotation, so that the energy of the pulp striking the wall in combination with the centrifugal force generated on the pulp after deposit on the wall will be sufficient to cause the pulp to spread out into a relatively thin layer on the wall and to move up the wall for a portion only of the height of the wall. Upon stopping of the feeding of food into the machine this pulp deposited on the wall will be retained thereon and thoroughly dried. Upon further feeding of the machine the pulp subsequently deposited on the wall will act to displace the pulp already thereon and cause a lifting of the latter strata of pulp upwardly to the top of the basket from whence it is discharged. Thus the pulp will be successively discharged from the machine and the machine may be kept in substantial continuous operation and yet the pulp will be retained in the centrifuge for a sufficient period to substantially completely dry the pulp. This feature is of considerable importance in the present invention, for in machines of this character heretofore used wherein the pulp has been centrifugally lifted over the wall of the rotating basket, the pulp has been continuously moved up the basket wall and out of the basket and even where moved slowly the same is not retained in the basket for a sufficient period to enable complete drying of the pulp.

Referring more specifically to the accompanying drawings, the machine as therein depicted comprises a base support 6, here of cylindrical form, and in which is mounted an electric motor 7 having a vertical drive shaft 8. Mounted on the top 9 of the casing is a bowl member 11 herein providing a bowl or sump 12 for the juice extracted and which is provided adjacent the lower end thereof with a discharge spout 13 for the juice, the spout and sump being connected by a passage 14. A collar 16 is mounted on the top of the member 11 and provides a vertical continuation of the chamber or sump 12 and is enclosed across the top thereof by means of a cap or end member 17. Preferably, the collar 16 is detachably secured to the top of the bowl as by means of fastening levers 18 and the cover 17 is likewise preferably detachably secured to the top of the collar as by means of screws 19.

Mounted within a tubular part 21 of the bowl member 11 is a bearing sleeve 22 through which is mounted and journaled an extension shaft 23, here secured at its lower end to the motor shaft 8. The upper end 24 of the shaft 23 is enlarged and overlies the upper end of the bearing sleeve 22 and is preferably journaled in the sleeve by means of a ball bearing 26 as here shown.

The centrifuge of the present invention is as aforementioned, provided in the form of a basket 27 which in the present machine is mounted on the upper end of shaft 23 for rotation about the vertical axis of the shaft and which is contained in the chamber defined by the bowl member 11 and the collar 12. The basket comprises a flat disc-like bottom 28 which is provided with a stud 29 threaded into the upper end of shaft 23 and includes a concentric perforated side wall 31 which extends upwardly and outwardly from the bottom 28. A reenforcing ring 32 is secured to the upper edge of the wall 31 for rigidly holding the wall in shape during high speed rotation. Preferably, the wall 31 is spun from perforated sheet brass or the like and is seamed or brazed or otherwise secured at its upper and lower edges to the bottom 28 and the ring 32. The bottom 28 is preferably formed of steel and in the present construction provides both a bottom for the basket and a grater for the machine. This is effected by forming on the bottom a plurality of raised cutting teeth or elements 33 which may be milled or cast or otherwise formed integrally with the bottom disc. As will be best seen from Figure 2, these cutter teeth are arranged in parallel rows and are of generally oblong shape, each having a substantial dimension pointing to the outer periphery of the bottom. The teeth are preferably provided substantially completely across the entire interior surface of the bottom disc. By reason of the elongated and generally non-radial form of the teeth, the teeth provide an important shearing as well as direct cutting action on the food fed to the disc while the latter is rotated and in addition serve as impeller blades or vanes for centrifugally throwing the ground food outwardly across the bottom of the basket.

The food such as fruits and vegetables or the like, is fed into the machine through a tube 34 which is supported at its upper end 36 in an opening 37 in the cover plate 17 and which extends downwardly through the interior of the basket to position the lower discharge end 38 thereof in proximity to the cutter teeth 33. Preferably, the upper end 36 of the tube is of circular form and is mounted generally concentric to the axis of rotation of the basket. On the other hand the lower portion of the tube is offset from the axis of rotation and is of generally semi-circular form in cross-section so as to present the food at the lower end 38 of the tube to the grinding disc in an eccentric relation relative to the axis of rotation of the disc. By reason of the narrowing of the tube width, the food will be readily compacted in passing from the enlarged outer end to the confined inner end of the tube and thereby more firmly held for grating or grinding. Preferably, a flange or foot-piece 39 is formed on the lower end 38 of the tube in circumscribing relation to the tube opening which overlies the majority of the area of the grinding disc, so as to confine the movement of the food to the disc while being ground and outwardly displaced thereacross. The foot-piece 39 in the present instance is substantially circular and concentrically arranged relative to the axis of the disc.

During the operation of the machine, the food is pressed downwardly through the tube onto the grinder disc and is ground and thrown outwardly onto the upwardly diverging side wall 31, and the juice is centrifugally expelled through the screen into the surrounding chamber and defined by the collar 16 and the bowl member 11 and gravitates into the sump 12 through the opening 14 and out of the spout 13. At the same time the pulp or fibrous material of the food being treated is moved upwardly over the wall 31 and over the top of the reenforcing ring 32. As here shown, the cover plate 17 is depressed in a central portion thereof so as to lie somewhat within the basket 27, whereby an annular wall 41 of the cover defines with the upper extremity of the basket a channel 42 for the upward passage of the pulp. This channel communicates with a horizontal annular pulp receiving space 43 defined between the cover 17 and the reenforcing ring 32 and the pulp is moved outwardly through this latter space to a discharge opening 44 provided in the collar 16 in registration with the receiver space 43. A shroud or cover 46 is preferably mounted over the opening 44 for directing the fibre downward in a confined path of discharge. The wall 41 is preferably formed with an air opening 47 opposite to the discharge slot 44 for admitting air into the pulp passages 42 and 43 to relieve the reduced pressure therein due to the centrifugal movement of the pulp and thus preventing a suction in the machine which would otherwise interfere with the free flow of the liquid from the sump 12.

Preferably, the collar 16 is provided with an inwardly extending lip 48 which underlies the reenforcing ring 32 so as to provide an overlapped engagement of the ring and a substantial sealing of the pulp and liquid passages. Ample space may be left between the lip and the reenforcing ring as here shown, so as to provide a free running condition and normally the pulp will flow freely over the top of the ring and out of the discharge passage without any lodging of pulp in the crevice between the lip and the ring. In order to insure the proper movement of the pulp and to dislodge any pulp which may tend to work itself through the space between the lip and the ring and into the liquid chamber, I preferably form a plurality of circumferentially spaced notches 49 in the outer and upper peripheral edges of the ring 32 which act to keep the pulp in a state of agitation and facilitate the centrifugal movement of the pulp away from the edge of the basket and out of the discharge slot 44.

One of the important advantages of the present machine and as hereinabove noted, is the arrangement for the discharge of the pulp over the side wall 31 of the basket so as to obtain a proper dehydration of the pulp and at the same time obtain an automatic ejection of the pulp from the machine whereby the machine may be continuously operated as long as desired without requiring the stopping of the machine and removal of the pulp from the basket. To accomplish this result, I have predetermined the several variables affecting the centrifugal force and the movement of the pulp, viz., the size of the basket, the speed of rotation, and the pitch of the basket side wall, so as to cause the pulp to form in a relatively thin layer on the lower portion of the wall and to move upwardly on the wall for a portion only of the vertical height of the wall, above which the pulp will not advance under its own centrifugal force. The pulp is thus retained on the upper part of the wall until forcibly lifted out of the basket by the action of the lower pulp and hence a substantially complete drying of the pulp may be effected. In this connection the pulp or fibrous matter of various fruits and vegetables act differently, depending upon the texture of the pulp and the liquid content of the pulp. In the case of substantially all vegetables such as carrots, celery, parsley, cabbage, peas, spinach, turnips, etc., the pulp will be retained on the wall of the basket, while in the case of many fruits such as grapes and others of high liquid content, the pulp will normally work its way out of the basket under the operation of centrifugal force alone. While the latter movement of the pulp is not as satisfactory as the former for the reasons indicated, yet the design of a machine of the present character is of necessity somewhat of a compromise in order to enable its effective use with a wide variety of fruits and vegetables. I have found that a certain relationship between the aforementioned variables of size, speed and pitch must be observed in order to obtain a successful device of this character which may be used with any substantial range of products. This relationship may be embraced as follows. Considering the wall portion of the basket as an inverted frustro-conical shaped member, the upper and lower base diameters bear a relation to each other in the ratio of approximately 1 to 0.67 and have an axial height or separation of a distance at least 0.28 times the length of the upper base diameter and the basket is rotated at a speed in revolutions per minute of approximately two thousand times the upper base diameter in inches. Viewed in another light and considering the basket side wall as trapezoidal in cross-section, I have found that a workable structure may be provided by providing a ratio of the average width of the cross-section in inches to the pitch of the side wall (the tangent of the angle formed with vertical) at approximately 2.44 and providing a ratio of the rotating speed of the basket in R. P. M. to said average width in inches of approximately 2400. In the present machine the basket has an average diameter of approximately four inches, the angle of inclination of the major wall portion is approximately 22°, and the speed of rotation of the basket is approximately ten thousand revolutions per minute. At the bottom of the wall I form a short vertical upstanding shoulder 51 which receives the initial impact of the ground fruit and which connects with a short portion 52 of the wall inclined outwardly at from 30° to 36° and which then merges into a wall section 53 having an angle of divergence from vertical of from 20° to 25° and which in turn connects with a top section 54 having an angle of divergence from vertical of from 9° to 13°. The section 53 forms the majority of the length of the side wall. Preferably, the shoulder 51 is set at vertical, the section 52 at 33° from vertical, the section 53 at 22° from vertical, and the section 54 at 11° from vertical. The side wall lengths of the sections in the present basket are preferably set at approximately ⅛ inch, ¼ inch, 1 1/16 inch and 1/16 inch, and the average diameter of 4 inches aforementioned taken with respect to the section 53.

In accordance with the above construction the pulp is thrown radially outwardly against the shoulder 51 which causes a breaking up and deflection of the pulp onto the section 53 of the wall, the pulp normally clearing the section 52 and a part of the section 53 continuous therewith. The liquid content of the pulp being heavier than the fibrous content, the majority of the liquid will deposit on the wall section 52 and the adjacent portion of section 53. After striking the wall section 53, the pulp spreads out into a relatively thin layer and moves upwardly to adjacent the section 54. Various fruit and vegetable pulps will attain different heights on the section 53 before stopping, some stopping short of the section 54 and others moving up to the section 54. Upon feeding further food against the grater and the throwing of subsequent pulp against the screen, the last deposited pulp will engage and lift the upper strata of pulp so as to cause the same to move up and over the upper portion of section 53 and section 54 and over the ring 32. Preferably the ring 32 overhangs the upper edge of the basket wall as here shown, so as to provide a slight obstruction to the vertical movement of the pulp.

I claim:

1. A fruit and vegetable juice extractor comprising, a rotary food basket mounted on a substantially vertical axis of rotation and having an annular concentric perforated side wall and a bottom wall and adapted to receive ground food such as fruits and vegetables and the like adjacent the bottom thereof, means to deliver food to be ground to said bottom wall, means for rotating said basket about its axis at a high velocity of several thousand revolutions per minute to effect a centrifugal movement of the ground food outwardly against the lower part of said wall, the lower part of said wall being formed with a shoulder to receive and break up the ground food centrifugally thrown thereagainst, the remainder of said wall sloping upwardly and outwardly from said shoulder to facilitate the upward travel of the ground food thereover in a relatively thin layer, and juice collector means surrounding said wall and adapted to receive the juice centrifugally expelled through said wall.

2. A fruit and vegetable juice extractor comprising, a rotary food basket mounted on a substantially vertical axis of rotation and having an annular concentric perforated side wall and a bottom wall and adapted to receive ground food adjacent the bottom thereof, means carried on said bottom wall and including a plurality of raised elements having a substantial radial dimension, means to feed food to be ground to said bottom wall, means for rotating said basket at a high velocity in the order of several thousand revolutions per minute to effect a centrifugal throwing of the ground food by the elements against said side wall adjacent the lower portion thereof, said lower side wall portion being formed with a substantially vertical shoulder to receive and break up the ground food thrown thereagainst, the remainder of said side wall sloping outwardly and upwardly to facilitate the upward movement of the ground food thereover, and juice collector means surrounding said wall and adapted to receive juice centrifugally expelled therefrom.

3. A fruit and vegetable juice extractor comprising, a rotary food basket mounted on a substantially vertical axis of rotation and having an annular concentric perforated side wall and a bottom wall and adapted to receive ground food and the like adjacent the bottom thereof, means for rotating said basket about its axis at a velocity of approximately ten thousand revolutions per minute to effect a centrifugal movement of the ground food outwardly against the lower part of said wall, the lower part of said wall being formed with a substantially vertical shoulder to receive and break up the pulp centrifugally thrown thereagainst, the remainder of said wall consisting in sections of different inclinations to vertical, the section next to said shoulder being inclined at approximately 30° to 36°, the next upper section being inclined at between 20° and 25°, and the uppermost section being inclined at between 9° to 13°, the second named section comprising a majority of the vertical height of the wall, and juice collector means surrounding said wall and adapted to receive juice centrifugally expelled therefrom.

4. A fruit and vegetable juice extractor comprising, a rotary food basket mounted on a substantially vertical axis of rotation and having an annular perforated concentric side wall diverging upwardly from the bottom of the basket and adapted to receive ground food or the like adjacent the bottom thereof, means for feeding food to be ground to said bottom wall, means for rotating said basket at a high velocity to cause the passage of ground food onto said wall whereby the food pulp will pass upwardly on said wall and over the upper edge thereof, juice collector means surrounding said wall, a relatively wide reenforcing ring mounted on the upper edge of said basket over which the food pulp is passed, and a pulp receiving chamber surrounding said ring and having a discharge opening for the pulp.

ALBERT G. REYNOLDS.